United States Patent
Nikles

(10) Patent No.: US 11,774,019 B2
(45) Date of Patent: Oct. 3, 2023

(54) CONNECTION SYSTEM FOR DISTRIBUTING WATER

(71) Applicant: NIKLES INTER AG, Aesch (CH)

(72) Inventor: Gerhard Nikles, Aesch (CH)

(73) Assignee: NIKLES INTER AG, Aesch (CH)

( * ) Notice: Subject to any disclaimer, the term of this patent is extended or adjusted under 35 U.S.C. 154(b) by 0 days.

(21) Appl. No.: 17/393,842

(22) Filed: Aug. 4, 2021

(65) Prior Publication Data
US 2022/0042633 A1 Feb. 10, 2022

(30) Foreign Application Priority Data

Aug. 5, 2020 (IT) .................. 202020000004645

(51) Int. Cl.
*F16L 27/107* (2006.01)
*F16L 27/10* (2006.01)

(52) U.S. Cl.
CPC ......... *F16L 27/107* (2013.01); *F16L 27/1012* (2013.01)

(58) Field of Classification Search
CPC . F16L 33/207; F16L 33/2071; F16L 33/2076; F16L 19/0231; F16L 19/0206; F16L 27/107; F16L 27/1012
See application file for complete search history.

(56) References Cited

U.S. PATENT DOCUMENTS

| | | | | |
|---|---|---|---|---|
| 2,273,397 A | * | 2/1942 | Couty ................. | F16L 27/0816 131/225 |
| 3,999,781 A | * | 12/1976 | Todd ................... | F16L 33/2076 285/12 |
| 5,160,178 A | * | 11/1992 | Iwabuchi ............. | F16L 19/025 285/354 |
| 6,485,064 B1 | * | 11/2002 | Davidson ............ | F16L 33/2076 285/353 |

(Continued)

FOREIGN PATENT DOCUMENTS

| | | |
|---|---|---|
| DE | 90 05 930 U1 | 8/1990 |
| DE | 44 30 114 A | 2/1996 |

(Continued)

OTHER PUBLICATIONS

Partial European Search Report for European Patent Application No. 21189167.6 dated Jan. 3, 2022, 12 pages.

(Continued)

*Primary Examiner* — David Bochna

(74) *Attorney, Agent, or Firm* — Merchant & Gould P.C.

(57) ABSTRACT

A connection system (1) is for distributing water in a domestic system. The connection system includes a flexible pipe (2) having at least one end portion for connection to a hydraulic connector. At least one hollow insert (3, 6) axially engages the end portion of the flexible pipe (2). The insert (3, 6) includes a flange-shaped head portion (31, 61) which abuts against the free end of the end portion of the pipe (2). A reinforcement portion (32, 62) extends from the head (Continued)

portion (31, 61) into the end portion of the pipe (2). At least one annular bushing (4) mechanically clamps onto the end portion of the pipe (2). At least one connecting element (5) is fitted onto the end portion of the pipe (2) and includes a device for connection to the hydraulic connector.

8 Claims, 5 Drawing Sheets

(56) References Cited

U.S. PATENT DOCUMENTS

| | | | |
|---|---|---|---|
| 7,108,292 B2 * | 9/2006 | Lipscomb | F16L 33/20 |
| | | | 285/259 |
| 2008/0217432 A1 | 9/2008 | Wu | |
| 2012/0117784 A1 * | 5/2012 | Collin | F16L 33/2076 |
| | | | 285/386 |
| 2015/0102597 A1 * | 4/2015 | Wood | F16L 33/2071 |
| | | | 285/256 |
| 2016/0312929 A1 * | 10/2016 | Blanchette | F16L 33/207 |

FOREIGN PATENT DOCUMENTS

| | | | |
|---|---|---|---|
| DE | 44 30 114 A1 | 2/1996 | |
| EP | 0 728 978 A1 | 8/1996 | |
| EP | 2 420 628 A1 | 2/2012 | |
| JP | 2012122533 A * | 6/2012 | F16L 33/2071 |
| JP | 2016109209 A * | 6/2016 | F16L 33/207 |
| WO | WO-03072883 A1 * | 9/2003 | F16L 33/2071 |
| WO | 2012/077549 A1 | 6/2012 | |
| WO | 2012077549 | 6/2012 | |

OTHER PUBLICATIONS

European Search Report received in corresponding application dated May 12, 2022; 13 pages.

* cited by examiner

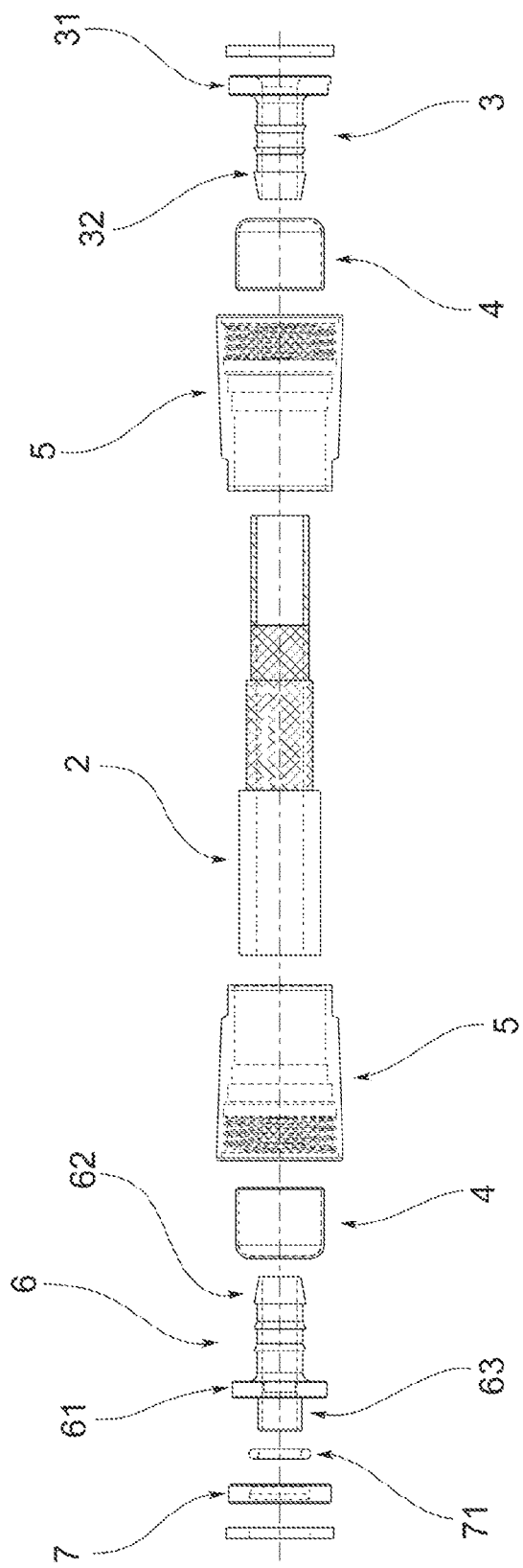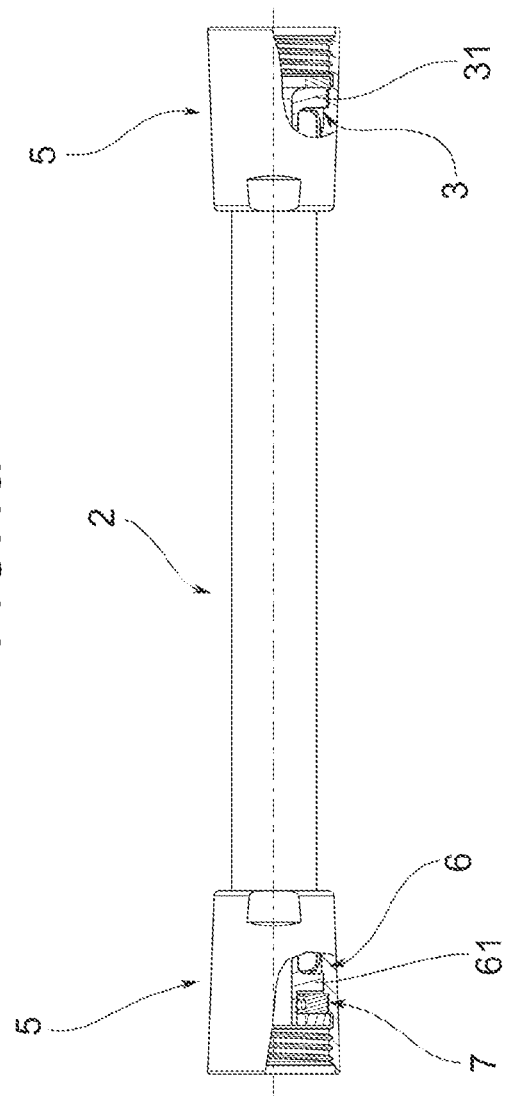
FIG.1a
FIG.1b

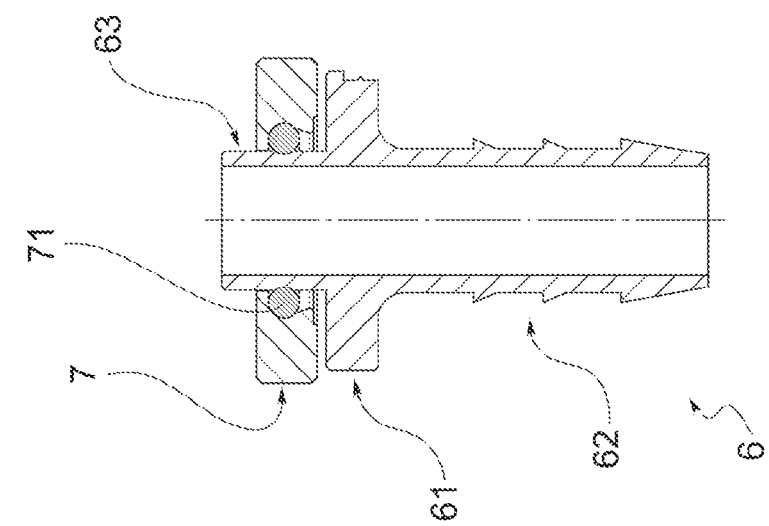
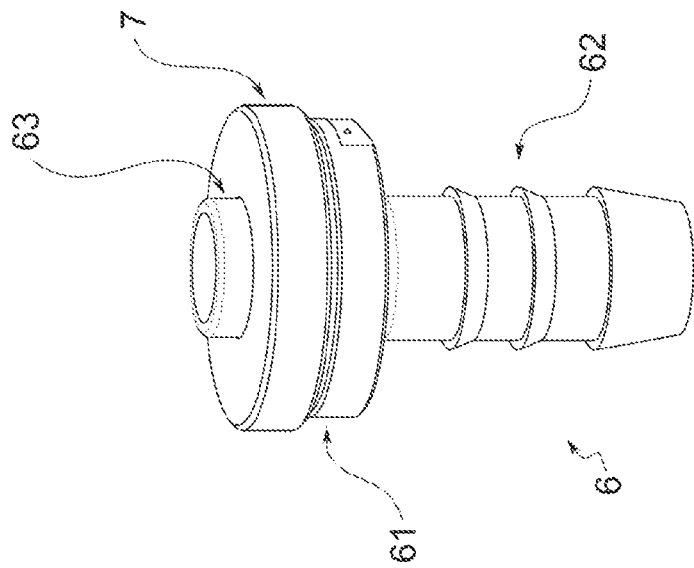
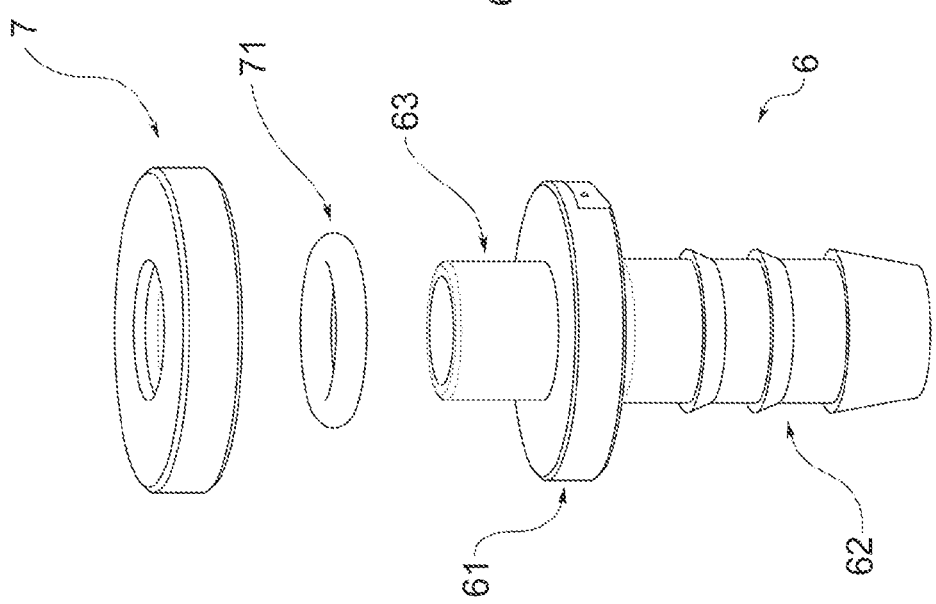
FIG.3c
FIG.3b
FIG.3a

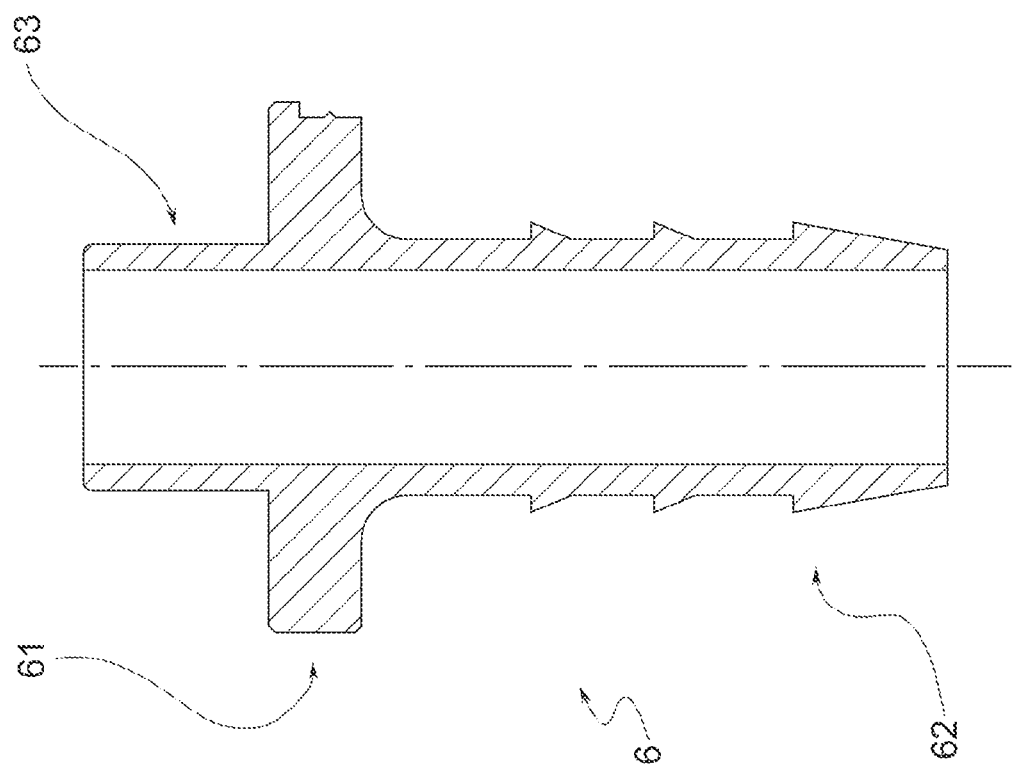
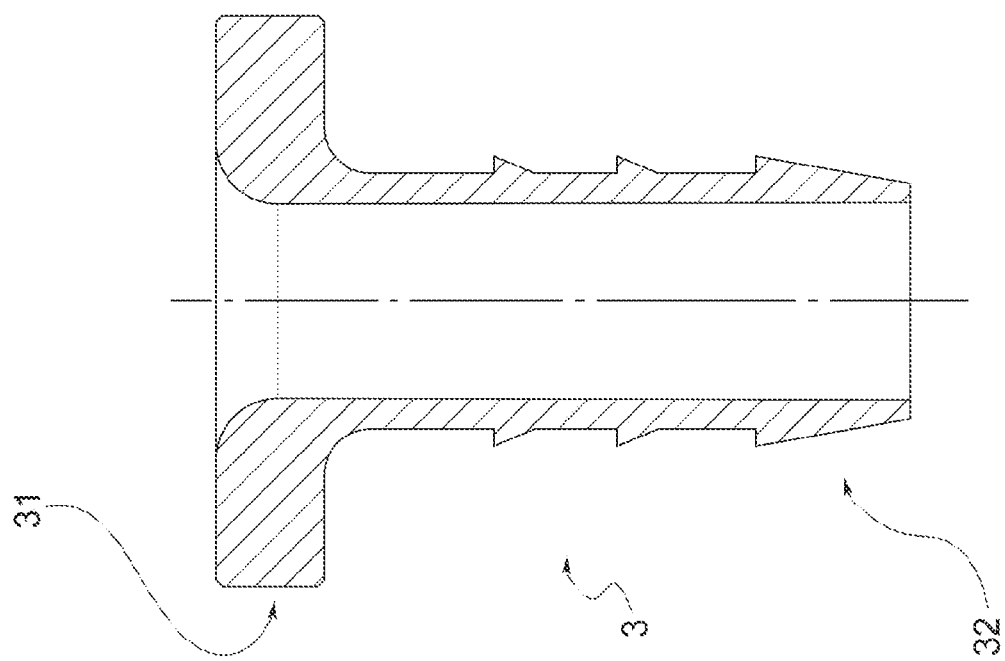

CONNECTION SYSTEM FOR DISTRIBUTING WATER

This application claims benefit of Serial No. 202020000004645, filed 5 Aug. 2020 in Italy, and which application is incorporated herein by reference. To the extent appropriate, a claim of priority is made to the above-disclosed application.

FIELD OF THE INVENTION

The present invention relates to a connection system for distributing water in a domestic system.

The technical field to which the present invention applies is that of domestic plumbing systems.

BACKGROUND OF THE INVENTION

The term plumbing system means the domestic system which allows the distribution and access to water by virtue of a faucet or other hydraulic connector.

Solutions of pipes made of various materials which allow the connection to the domestic distribution system are known from the prior art.

Among the most common models, pipes made of metal mesh are known, characterized by higher costs than other solutions and having however drawbacks related to the accumulation of scaling which can cause the breakage of the showerhead and/or faucet.

In addition, the metal pipe solutions are prone to oxidation resulting in loss of surface gloss and formation of rust, thus requiring relatively frequent maintenance and replacement.

Therefore, various models of pipes made of plastic materials, such as ABS or PVC, for example, are known from the prior art, which partially solve the drawbacks mentioned above, but which are less flexible and less resistant to clamping pressures, ending up in the sudden failure over time.

In addition, such plastic pipes are prone to show dirt due to the local accumulation of water over time, ending up being less hygienic, thus less suitable to contact with drinking water, as well as having a poorer appearance.

SCOPE OF THE INVENTION

It is the object of the present invention to provide a connection system which applies to the aforementioned technical field and having mechanical properties suitable to withstand the forces impressed during the clamping.

It is a further object of the present invention to combine the mechanical properties mentioned above with hygienic characteristics which are suitable to contact with water over time.

Such objects are achieved by the a connection system for distributing water in a domestic system, comprising:
i) a flexible pipe having at least one end portion suitable for the connection to a hydraulic connector;
ii) at least one hollow insert which axially engages said end portion of the flexible pipe, wherein said insert comprises:
   a flange-shaped head portion which abuts against the free end of said end portion of the pipe,
   a reinforcement portion which extends from the head portion into the end portion of the pipe;
iii) at least one annular bushing mechanically clamped onto the end portion of the pipe; and
iv) at least one connecting element fitted onto the end portion of the pipe and comprising a device for the connection to the hydraulic connector. Moreover, such an object is achieved by a connection system for distributing water in a domestic system, comprising:
i) a flexible pipe having at least one end portion which is suitable for the connection to a hydraulic connector, wherein said end portion comprises a terminal co-molded with the pipe, wherein the terminal and the pipe are made of a material complying with the DVGW W270:2007 standard;
ii) at least one connecting element fitted onto said end portion of the pipe provided with the terminal comprising a device for the connection to the hydraulic connector.

BRIEF DESCRIPTION OF THE DRAWINGS

In addition, further features and advantages of the present invention will become apparent from the description provided below of preferred embodiments thereof, given by way of non-limiting examples, with reference to the accompanying drawings, in which:

FIGS. 1a and 1b show an exploded depiction of the components of the connection system and an assembly configuration of said components according to the present invention, respectively, in an embodiment.

FIGS. 3a, 3b, and 3c show an exploded perspective view, a perspective view with parts assembled, and an axial section of some of the components of the connection system according to the present invention, respectively, in an embodiment.

FIGS. 4a and 4b show an axial section of a component of the connection system, in a constructional variant.

DESCRIPTION OF PREFERRED EMBODIMENTS

Figure 2:
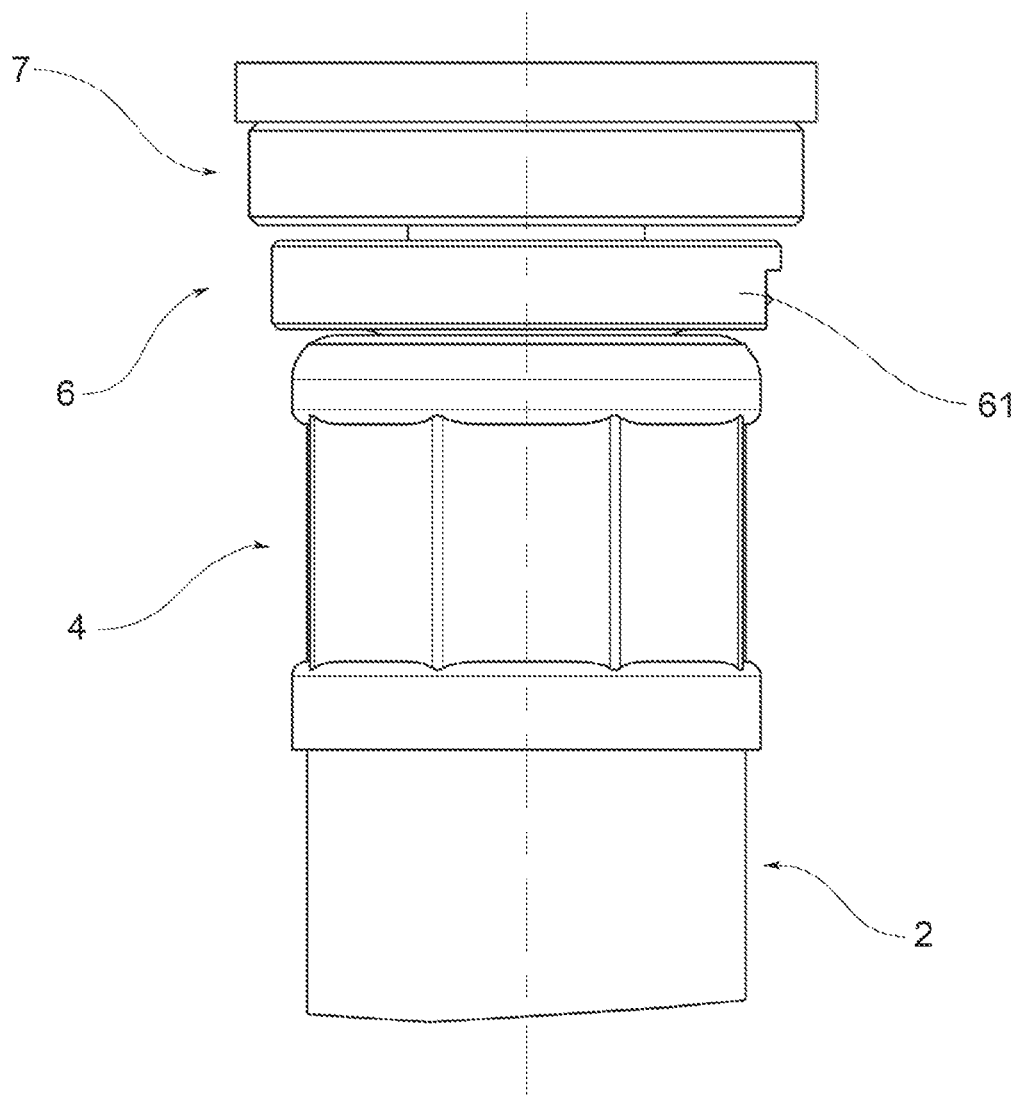
FIG. 2 shows a detail of one end of the assembled connection system, in an embodiment.

With reference to FIGS. 1a and 1b, reference numeral 1 indicates as a whole the connection system according to the present invention.

According to the present invention, the connection system 1 comprises a flexible pipe 2 having at least one end portion which is suitable for the connection to a hydraulic connector, not depicted in the figures.

For example, the connection system according to the invention can connect a showerhead to a wall-mounted hydraulic connector of a shower, or can connect a spout of a faucet of a sink, such as a kitchen sink, for example, to the domestic plumbing system.

According to an embodiment of the present invention, the pipe 2 comprises an inner PVC layer, an outer PVC layer, and an intermediate layer comprising longitudinal twisted fabric fibers and comprising a silver paint.

Furthermore, in an embodiment of the present invention, said pipe 2 is made of a material complying with the DVGW W270:2007 standard.

In other words, the pipe 2 is made of a material suitable to come into contact with drinking water supplied by a plumbing system, without altering the properties which make the water suitable for human consumption over time.

Referring to any one of the figures of the present invention, the connection system 1 comprises at least one hollow insert 3; 6 which axially engages at least one of the two opposite end portions of the flexible pipe 2.

According to an embodiment, the hollow insert 3; 6 comprises a head portion 31; 61 having a flange-like shape which abuts against the free end of the pipe 2. A reinforcement portion 31; 62 extends from the head portion 32; 61, being housed inside the end portion of the pipe 2.

The insert 3; 6 is preferably made in one piece of a material complying with the DVGW W270:2007 standard.

In other words, the insert 3; 6 is made of a material suitable to come into contact with drinking water supplied by a plumbing system, without altering the properties which make the water suitable for human consumption over time.

Referring to FIGS. 1 and 2, the connection system 1 comprises an annular bushing 4 mechanically clamped onto the end portion of the pipe 2 which accommodates the reinforcement portion 32; 62 of the insert 3; 6.

In other words, after the clamping operation, the annular bushing 4 makes the end portion of the pipe 2 and the hollow insert 3; 6 integral with each other. Thereby, the hollow insert 3; 6 cannot translate axially with respect to the pipe 2.

According to an embodiment, particularly with reference to FIGS. 1, 4a and 4b, the hollow insert 3; 6 comprises one or more annular teeth 35; 65 axially spaced apart from one another along the reinforcement portion 32; 62.

After clamping, these annular teeth 35; 65 engage the inner wall of the pipe 2, interpenetrating therewith. Furthermore, the orientation of the annular teeth 35; 65 can be chosen so that the thrust applied to the hollow insert by the pressurized water present in the pipe 2 further contributes to making the annular teeth 35; 65 penetrate the wall of the pipe 2.

According to the present invention, with particular reference to FIG. 1, the connection system 1 comprises at least one connecting element 5, having a truncated cone shape, for example, fitted onto the end portion of the pipe 2 and comprising a device for the connection to the hydraulic connector.

The connecting element 5 allows the actual connection of the connection system to the hydraulic connector of the domestic system.

In an embodiment, the connection device is threaded connection device. For example, the connection device comprises a thread 55 obtained in the inner surface of the side wall of the connecting element 5.

In a further embodiment shown in particular in FIG. 4b, the insert 6 comprises a hollow pin 63 which extends from the head portion 61 in a direction opposite to the reinforcement portion 62. For example, the hollow pin 63 is made in one piece with the hollow insert 6.

According to such an embodiment, with reference to FIGS. 3a, 3b and 3c, a rotatable annular element 7 is fitted about the hollow pin 63 with rotation possibility, being suitable to decouple the pipe 2 under rotation from the connecting element 5 when the latter is integral with the hydraulic connector.

In other words, the presence of the rotatable annular element 7 allows to vary the angular position of the pipe 2 with respect to the connecting element 5 when using the connection system.

Preferably, the rotatable annular element 7 is also made of a material complying with the DVGW W270:2007 standard.

According to an embodiment, the rotatable annular element 7 houses a hydraulic sealing element 71, such as an O-ring, for example, which cooperates with the side wall of the hollow pin 63.

In other words, the hydraulic sealing element 71 achieves a hydraulic continuity between the insert 6 and the end portion of the pipe 2 in which it is inserted.

In an embodiment, the connecting element 5 internally forms a seat for the annular element 7.

Figure 5A:
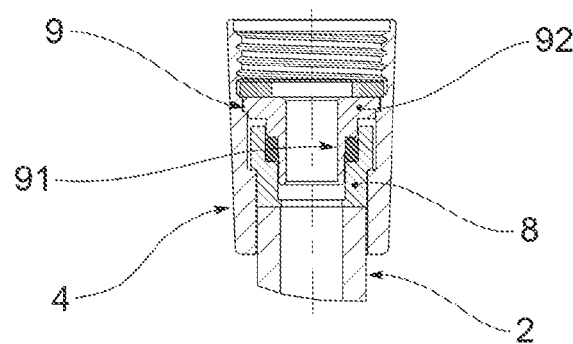
FIGS. 5a, 5b, 5c, 5d, 5e show an axial section of an end portion of the connection system in an equal number of embodiments.
Figure 5C:
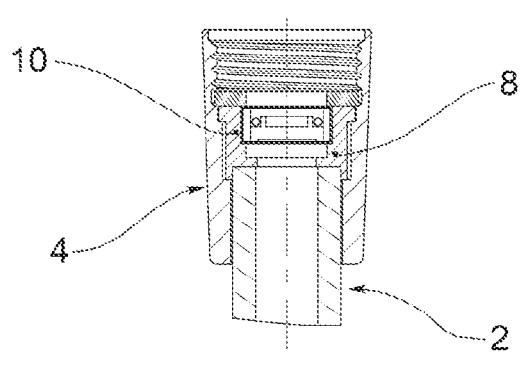
Figure 5B:
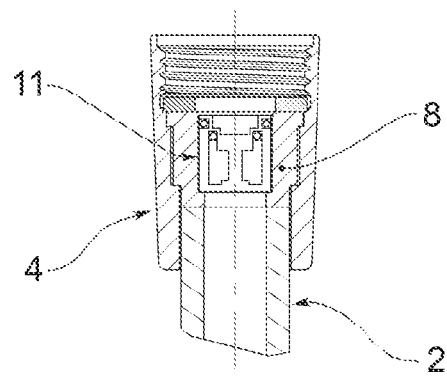
Figure 5D:
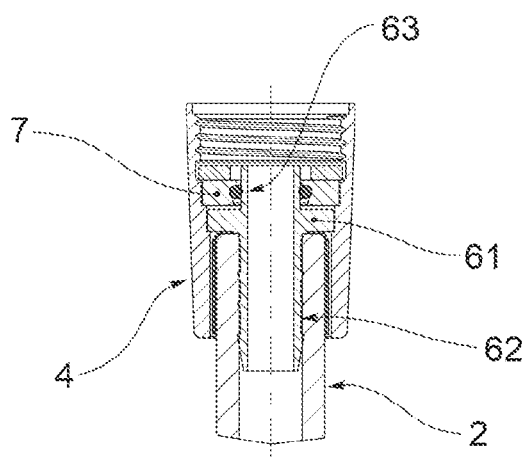
Figure 5E:
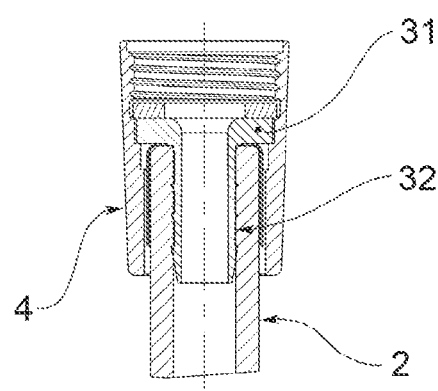

In a constructional variant shown in FIGS. 5a, 5b, 5c, the end portion of the pipe 2 comprises a terminal co-molded with the pipe 2.

The terminal 8 and the pipe 2 are preferably made of a material complying with the DVGW W270:2007 standard.

According to an embodiment depicted in FIG. 5a, a rotating bushing 9 made of a material complying with the DVGW W270:2007 standard, for example, is inserted into the co-molded terminal 8.

Such a rotating bushing 9 preferably comprises a guiding portion 91 inserted into the co-molded terminal 8 and a flanged head 92 which abuts against the edge of the co-molded terminal 8.

According to an embodiment of the present invention depicted in FIG. 5b, a non-return valve 11 is inserted into the co-molded terminal 8.

According to an embodiment of the present invention depicted in FIG. 5c, a flow limiter 10 is inserted into the co-molded terminal 8.

According to a preferred embodiment of the present invention, the connecting element 5 comprises at least one hydraulic seal, such as an O-ring, for example.

From the above, it is apparent that the devised connection system widely fulfills the intended objects by overcoming the typical drawbacks of the prior art.

The hollow inserts allow optimal clamping, because the plastics involved do not give yield due to the impressed forces nor are damaged, thus reducing the risk of sudden failure of the pipe.

Advantageously, after clamping, the teeth of the hollow inserts also locally interpenetrate into the inner wall of the pipe, thus avoiding the risk of axial release of the insert due to internal pressures.

Advantageously, in some embodiments, the connection system has an end equipped with elements which are free to rotate reciprocally, which prevent the pipe from winding on itself.

Advantageously, the connection system described in the present invention is also made of a material complying with the DVGW W270:2007 standard, whereby it is particularly suitable to come into contact with drinking water, even for prolonged use over time.

Still advantageously, the connection system comprises a pipe made of a plastic material, therefore less expensive, but flexible and durable at the same time.

In some embodiments, the pipe is painted with a durable silver paint which is not attacked by scaling, thus having a better appearance.

It is apparent that, in order to meet contingent needs, those skilled in the art may make changes to the invention described above, all of which are contained within the scope of protection as defined by the following claims.

What is claimed is:

1. A connection system for distributing water in a domestic system, comprising:
   i) a flexible pipe having at least one end portion configured for connection to a hydraulic connector;
   ii) at least one hollow insert axially engaging said end portion of the flexible pipe, wherein said hollow insert comprises:
      a flange-shaped head portion abutting against a free end of said end portion of the pipe;
      a reinforcement portion extending from the head portion into the end portion of the pipe; wherein the hollow insert comprises a hollow pin integrally formed with the hollow insert which extends from the head portion in a direction opposite to the reinforcement portion;

iii) at least one annular bushing mechanically clamped onto the end portion of the pipe;

iv) at least one connecting element having an outer surface, the outer surface having an axially continuous truncated cone shape fitted onto the end portion of the pipe and comprising a device for connection to the hydraulic connector; and v) a rotatable annular element fully axially aligned with said hollow pin and rotatably fitted about said hollow pin;

wherein the rotatable annular element comprises an inner annular seat housing a hydraulic sealing element.

2. A connection system according to claim 1, wherein the pipe comprises an inner PVC layer, an outer PVC layer, and an intermediate layer comprising longitudinal twisted fabric fibers and a silver paint.

3. A connection system according to claim 1, wherein the pipe is made of a material complying with the DVGW W270:2007 standard.

4. A connection system according to claim 1, wherein the insert is made of a material complying with the DVGW W270:2007 standard.

5. A connection system according to claim 1, wherein the rotatable annular element is made of a material complying with the DVGW W270:2007 standard.

6. A connection system according to claim 1, wherein the hydraulic sealing element comprises an O-ring.

7. A connection system according to claim 1, wherein the connecting element comprises an internal seat for the rotatable annular element, the rotatable annular element being coupled to allow varying an angular position of the pipe relative to the connecting element.

8. A connection system according to claim 1, wherein the insert comprises one or more annular teeth axially spaced apart from one another along the reinforcement portion, which engage an inner wall of the pipe.

* * * * *